(No Model.)
D. BIGELOW.
HAND WHEAT RAKE.
No. 304,899. Patented Sept. 9, 1884.
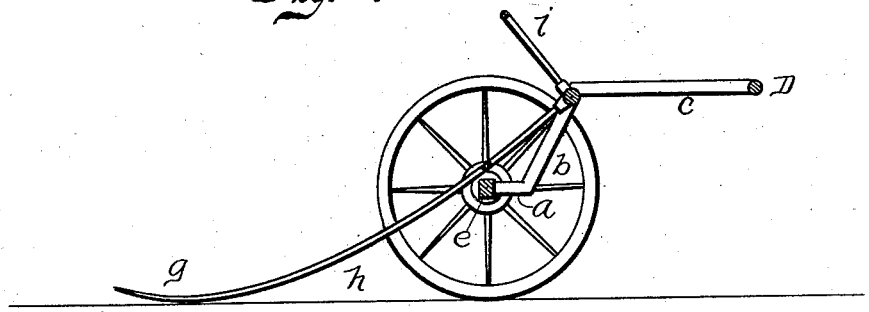
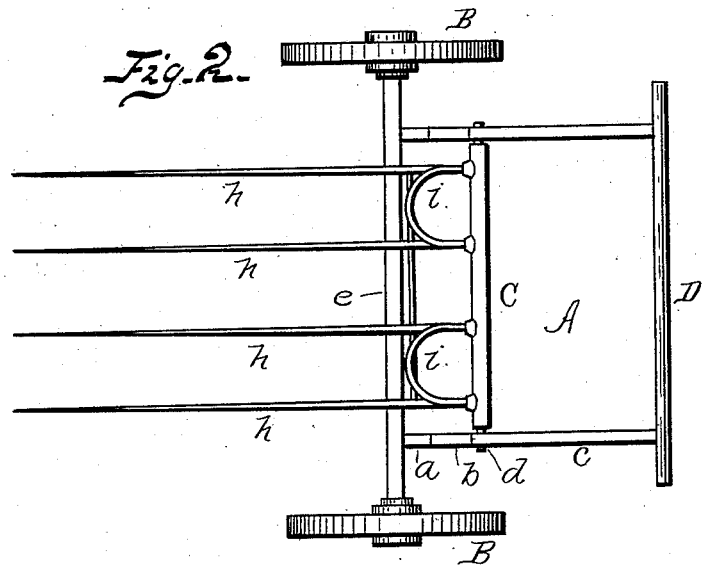
WITNESSES
F. C. Baldwin
M. Miller
INVENTOR
David Bigelow
per Frank Sheehy
ATTORNEY

UNITED STATES PATENT OFFICE.

DAVID BIGELOW, OF PAULDING, OHIO.

HAND WHEAT-RAKE.

SPECIFICATION forming part of Letters Patent No. 304,899, dated September 9, 1884.

Application filed September 26, 1883. (No model.)

*To all whom it may concern:*

Be it known that I, DAVID BIGELOW, a citizen of the United States, residing at Paulding, in the county of Paulding and State of Ohio, have invented certain new and useful Improvements in Hand Wheat-Rakes, of which the following is a specification, reference being had therein to the accompanying drawings.

This invention has relation to improvements in wheat-rakes; and it consists in the construction and novel arrangement of parts, as will be hereinafter more fully set forth, and particularly pointed out in the claim appended.

The invention has for its object to provide a cheap and simple device for gathering wheat and the like which may be easily operated by one person and will gather the wheat into gavels of any desired size. This object I accomplish by the means shown in the accompanying drawings, in which—

Figure 1 is a longitudinal vertical section of my machine, and Fig. 2 is a plan view of the same.

Referring by letter to the drawings, A designates the frame of the machine, formed with horizontal portions $a$, which are secured to the axle $e$, oblique portions $b$, and horizontal portions $c$, to which the handle D is attached.

The letter B indicates the wheels of the machine, which are mounted on the ends of the axle $e$, and upon which the machine travels. At the upper angle of the frame A is journaled, in suitable bearings, $d$, a rake-head, C, which has secured to it the curved tines $h$, which extend forward of the machine downward, and then slightly upward at their points $g$, as shown, to prevent the points from catching in weeds or other obstructions which may lie in the path of the machine. The head C is also provided with a suitable number of bow-shaped rods, which preferably extend from the base of one tooth to the base of the adjacent one in pairs transversely of the frame. These rods may be made of wood or metal, as may be found most desirable in construction; but the frame of the machine, for the purpose of cheapness, is constructed of wood entirely. The bows or loops $i$ are extended from the head C, at right angles to the tines or rake-teeth, and are secured to said rake-head in such position as to leave a space between the two, so as to permit the attendant to manipulate the gavel from the rear and left and remove it when formed by passing his arms under it between the loops $i$, above mentioned.

From the foregoing description the operation of my invention will be obvious. It will be seen that when the wheat is cut it may be quickly gathered into gavels and easily bound upon the machine; or, by pressing upon or pulling rearwardly the loops or bows $i$, the teeth or tines will be raised from the ground, when the machine may be carried to the point of delivery and the grain bound or removed in a loose state, as found preferable.

I do not wish to confine myself to the use of bowed rods or loops on the rake-bar, as straight or plain arms may be employed without departing from the spirit of my invention.

I am aware that hand wheat-rakes have been constructed in which a single axle is mounted upon two wheels and provided with rake-teeth, the axle also having rods or arms extending vertically therefrom, and that similar rakes have been provided with arms for supporting a rake-head above the axle, having a handle for manipulating the rake-teeth, and therefore do not claim such construction, broadly.

Having thus described my invention, what I claim as new, and desire to secure by Letters Patent, is—

As an improvement in hand wheat-rakes, the combination, with the axle $e$, mounted upon the wheels B B, of the frame consisting, essentially, of the lower horizontal portions, $a\,a$, secured at their forward ends to the axle $e$, the rearwardly inclined or oblique portions $b\,b$, extending from the said horizontal portions to the upper horizontal portions, $c\,c$, which have at their outer ends a transverse handle, D, and at their inner ends journal-bearings for the rake-head, the rake-head C, journaled in the forward ends of the horizontal portions $c\,c$, the teeth or tines $h$, secured to the rake-head, and the straight loops $i\,i$, also secured to the rake-head at right angles to the said teeth, the whole being arranged so as to bring the handle portion of the frame on an elevated horizontal plane and the rake-head within convenient reach of the operator, substantially as shown and described.

In testimony whereof I affix my signature in presence of two witnesses.

DAVID BIGELOW.

Witnesses:
MEDARY D. MANN,
K. ELIHU SHUSTER.